US006477268B1

(12) United States Patent
Chiang et al.

(10) Patent No.: US 6,477,268 B1
(45) Date of Patent: Nov. 5, 2002

(54) PRODUCING TRANSITIONS BETWEEN VISTAS

(75) Inventors: Cheng-Chin Chiang; Jun-Wei Hsieh; Tse Cheng, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/193,588

(22) Filed: Nov. 17, 1998

(51) Int. Cl.[7] ................................................ G06K 9/00
(52) U.S. Cl. ........................................ 382/154; 382/293
(58) Field of Search ................................ 382/154, 293, 382/294, 295, 284, 285, 286; 348/36, 39; 345/267, 634, 646

(56) References Cited

U.S. PATENT DOCUMENTS

| | | | | |
|---|---|---|---|---|
| 5,644,651 | A | 7/1997 | Cox et al. | |
| 5,655,033 | A | 8/1997 | Inoguchi et al. | |
| 5,703,961 | A | 12/1997 | Rogina et al. | |
| 6,078,701 | A * | 6/2000 | Hsu et al. | 382/294 |

OTHER PUBLICATIONS

PanoVR SDK—A software development kit for integrating photo–realistic panoramic images and 3–D graphical objects into virtual worlds, by Chiang et al., ACM VRST, 1997, pp. 147–154.*

Chiang, C., "A Method of Smooth Node Transition in Panoramic Image–Based Virtual Worlds", Advanced Tech. Ctr., Comp. and Comm. Res. Labs., ITRI, Taiwan.

Shenchang Eric Chen, "QuickTime VR–An Image–Based Approach to Virtual Environment Navigation" In Proc. SIGGRAPH 95, 1995.

Seitz et al., "View Morphing", Department of Computer Sciences, University of Wisconsin–Madison, 1996.

* cited by examiner

*Primary Examiner*—Joseph Mancuso
*Assistant Examiner*—Vikkram Bali
(74) *Attorney, Agent, or Firm*—Fish & Richardson P.C.

(57) ABSTRACT

A method is described for producing smooth transitions between a source vista and a destination vista with unknown camera axes in panoramic image based virtual environments. The epipoles on the source vista and the destination vista are determined to align the vistas. Corresponding control lines are selected in the vistas to compute the image flow between the vistas and to densely match the pixels. In-between image frames are computed by forward-resampling the source vista and backward-resampling the destination vista.

14 Claims, 10 Drawing Sheets

PRODUCING TRANSITIONS BETWEEN VISTAS

BACKGROUND

The invention relates to the field of panoramic image based virtual reality.

In a virtual reality setting, a user can interact with objects within an image-based virtual world. In one approach, the objects in the virtual world can be rendered based on a mathematical description of the objects, such as wire-frame models. The rendering work depends on the scene complexity, as does the number of pixels in an image. A powerful graphics computer interface is typically required to render the images in real time.

In an alternate approach, the virtual world can be rendered in the form of panoramic images. Panoramic images are images that are "stitched" from several individual images. Multiple images can be acquired of an object from different viewpoints which can then enable a user to view the scene from different viewing angles and to interact with objects within the panoramic image. A hybrid approach that superimposes 3D geometry-based interactive objects onto a panoramic scenery image background, can also be used. The above two methods enhance to some extent the interactivity for the panoramic image-based virtual worlds.

In the following, the following terminology will be used: a view image is an image projected on a planar view plane, such as the film plane of a camera; a vista image is an image that is projected on a geometrical surface other than a plane, such as a cylinder or a sphere; a panoramic image (or vista) is an image (or a vista) produced by "stitching" multiple images (or vistas).

To navigate freely between a panoramic image vista composed of multiple vista images, these vista images must be linked. However, smooth transitions are difficult to attain. One solution would be to continuously zoom between the vista images until the source vista approximates the destination vista, and then directly switch the image to the destination vista. Many users, however, find the quality of the visual effects of zoomed vista transitions still unacceptable.

Image morphing provides another solution to smooth abrupt changes between vistas. Typically, two corresponding transition windows with a number of corresponding points are located on the source and destination vistas. Scenes with larger disparity (depth) differences among the objects, however, are often difficult to align due to effects from motion parallax. Another problem can occur with singular views where the optical center of one vista is within the field of view of the other vista. Singular views are common in vista transitions, because the direction of the camera movement during a transition is usually parallel to the viewing direction.

SUMMARY OF THE INVENTION

The method of the invention provides smooth vista transitions in panoramic image-based virtual worlds. In general, the method aligns two panoramic vistas with unknown camera axes for smooth transitions by locating epipoles on the corresponding panoramic images. The method combines epipolar geometry analysis and image morphing techniques based on control lines to produce in-between frames which simulate moving a video camera a the source vista to a destination vista. Epipolar geometry analysis is related to the relative alignment of the camera axes between images and will be discussed below.

In a first aspect, the method of the invention locates an epipole on the source vista and an epipole on the destination vista and aligns the source vista and the destination vista based on the located epipoles.

In another aspect, the method determines the alignment between the panoramic vistas from the epipole of each vista and an image flow between corresponding image features of the aligned panoramic vistas. The method also forms at predetermined times and based on the image flow, intermediate forward resampled images of one of the vistas and corresponding backward resampled images of another one of the vistas and merges at each predetermined time the forward resampled image and the backward resampled image to form a sequence of in-between images. The image sequence can be displayed as a video movie.

The invention may include one or more of the following features:

For example, the method selects a control line on the source vista and a corresponding control line on the destination vista and computes the image flow between pixels on the source vista and the destination vista based on the control lines.

The method forms at predetermined times and based on the computed image flow, intermediate forward resampled images of one of the vistas and corresponding backward resampled images of another one of the vistas, and merges the forward and backward resampled images to form a sequence of in-between images.

The corresponding control lines selected on the images completely surround the respective epipoles. The image flow of each pixel on the images can then be inferred from the image flow of pixels located on the control lines.

Locating the epipoles includes selecting corresponding pairs of epipolar lines on the source vista and on the destination vista and minimizing by an iterative process the sum of squared differences of a projected coordinate between an image pixel located on one vista and the image pixels located on the corresponding epipolar line on the other vista. Preferably, locating the epipoles includes reprojecting the source vista and the destination vista to produce respective source and destination view images and determining the epipoles from the reprojected view images.

The forward-resampled and backward-resampled image pixels are added as a weighted function of time to produce a sequence of in-between images, much like a video movie.

Forward-resampled and backward-resampled destination pixels that have either no source pixel ("hole problem") or more than one source pixel ("visibility problem") or that are closer to a set of control lines than a predetermined distance ("high-disparity pixels") are treated special.

Other advantages and features full become apparent from the following description and from the claims.

BRIEF DESCRIPTION OF THE DRAWINGS

We first briefly describe the figures.

DESCRIPTION

Figure 1B:
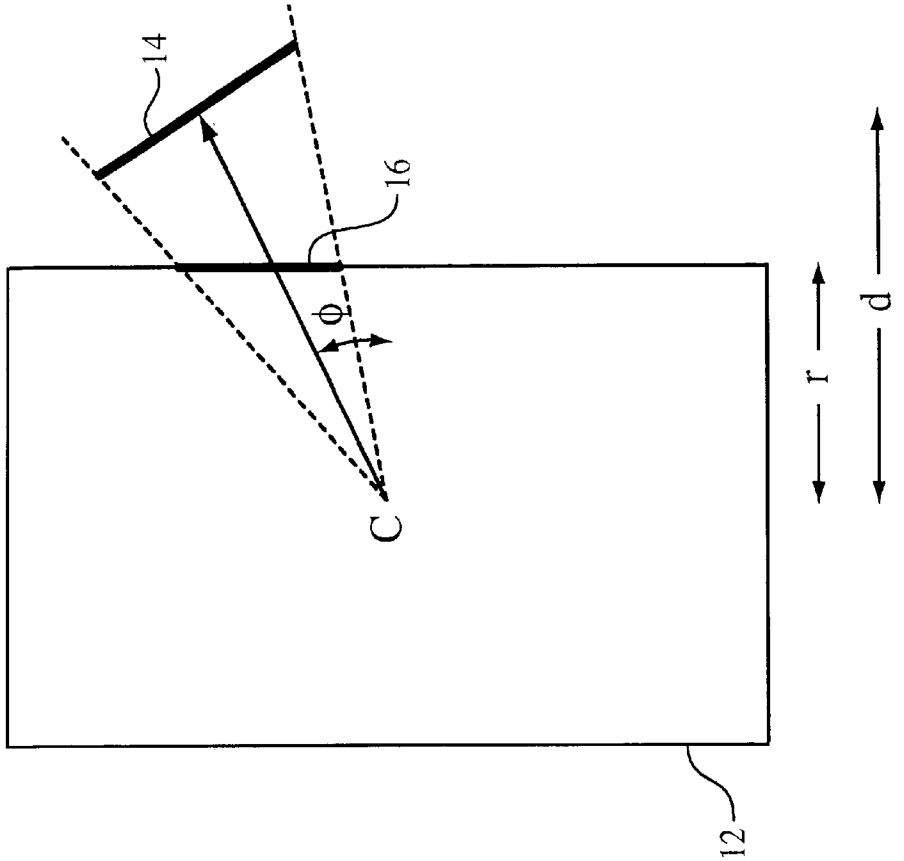
FIGS. 1A and 1B is a top view and a side view, respectively, of the relation between a vista image and a view image.
Figure 1A:
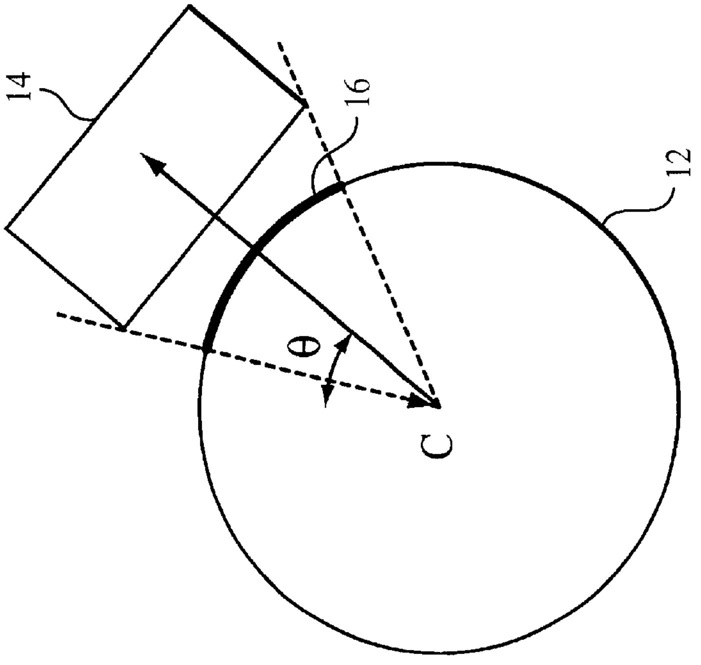

Referring first to FIGS. 1A and 1B, a planar view image 14 is acquired, for example, by a camera (not shown) and recorded in the film plane of the camera. It is usually difficult to seamlessly "stitch" two view images together to form a panoramic image due to the perspective distortion introduced by the camera. To remove the effects of this distortion, these images have to be reprojected onto a simple geometry, e.g., a cube, a cylinder, or a sphere. A cylinder is preferred because the associated mathematical transformations are relatively simple. In the present example, the view image 14 is projected onto the surface of a cylinder 12. The center of the image is characterized by viewing angles Θ and Φ. Hereinafter, we will refer to the image projected on the surface of the cylinder as "vista" image and the image projected on a view plane, e.g. on a projection screen, a film plane or a computer screen, as "view" image. The mathematical relationship between the coordinates (u,v) of a pixel located on the vista image and the coordinates of the corresponding pixel (x,y) located on the view image for a cylindrical geometry is:

$$u = \frac{\theta W_p}{2\pi} + f\tan^{-1}\left(\frac{x}{d\cos\phi + y\sin\phi}\right) \text{ and } \qquad \text{Eq. (A1)}$$

$$v = \frac{f\tan\left(\tan^{-1}\left(\frac{y}{d}\right) + \phi\right)}{\sqrt{\frac{x^2}{1 + (d\cos + y\sin\phi)^2}}}$$

or $$x = d\tan\left(\frac{u - f\theta}{f}\right)\left(\cos\phi - \sin\phi\tan\left(\phi + \tan^{-1}\left(\frac{v\sec\left(\frac{u-f\theta}{f}\right)}{f}\right)\right)\right) \qquad \text{Eq. (A2)}$$

and $$y = d\tan\left(\phi + \tan^{-1}\left(\frac{v\sec\left(\frac{u-f\theta}{f}\right)}{f}\right)\right)$$

wherein:

f is radius of the cylinder;

d is distance from the center of cylinder to center of view plane;

z is zoom factor (=d/f);

θ is pan angle (horizontal, $0 \leqq \theta \leqq 2\pi$);

ϕ is tilt angle (vertical, $-\pi \leqq \phi \leqq \pi$); and $W_p$ is width of the panoramic image.

The origin of the vista coordinate system is assumed to be in the upper left comer of the panoramic image.

Figure 2:
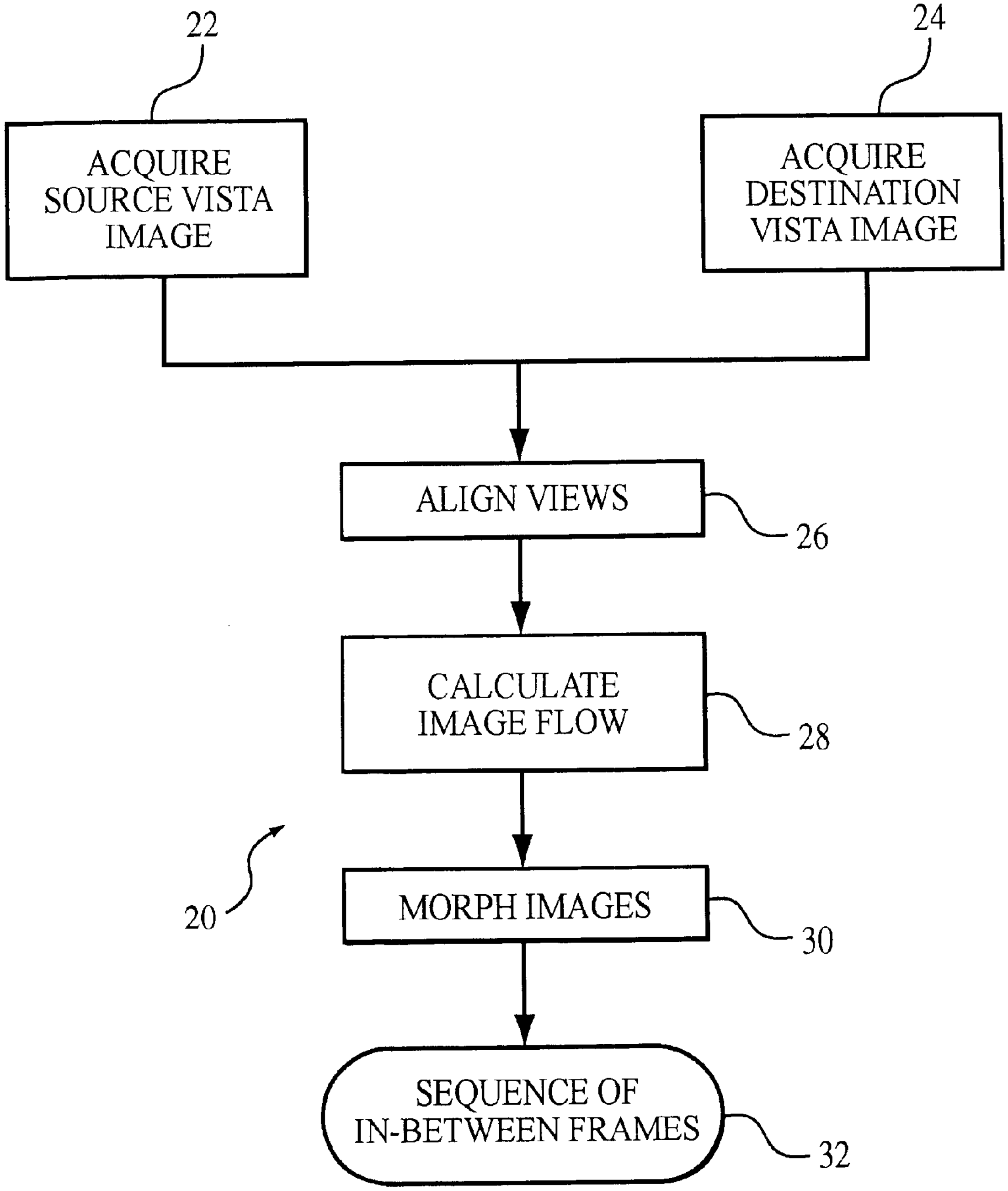
FIG. 2 is a flow diagram of a method for creating smooth transitions between two vista images according to the invention.

Referring now to FIG. 2, a flow diagram 20 describing the process for aligning and providing smooth transitions between a source vista image and a destination vista image with overlapping features. Typically, the two vista images (not shown) are acquired (22, 24) with different camera positions, i.e. different viewing angles Θ and Φ. A first step (26) then aligns the source vista image with the destination vista image by determining the epipoles of the two images to eliminate the effects caused by the different camera positions and camera angles. After the vista images are aligned, the image flow between the aligned vista images is computed (28) based on control lines. The change in the location of all points between the vista images is computed (morphed) (30) and a predetermined number of in-between frames is generated (32) to transition smoothly between the source and destination vista image. In the source and destination vistas, a user can pan and tilt the viewing angles towards any directions of the panoramic image. The user also can view the scene from any direction and zoom in (or out). The details of these steps will now be described in detail.

When transiting between a source and a destination vista image, the angles ($\Theta_s$, $\Phi_s$) of the source vista image and ($\Theta_d$, $\Phi_d$) of the destination vista image have to be determined (see FIG. 1). This is done by "epipolar" image analysis.

A detailed discussion of epipolar geometry can be found, for example, in "Three-dimensional computer vision" by Oliver Faugeras, The MIT Press, Cambridge, Mass. 1993. At this point, a brief discussion of the epipolar image geometry will be useful.

Figure 3:
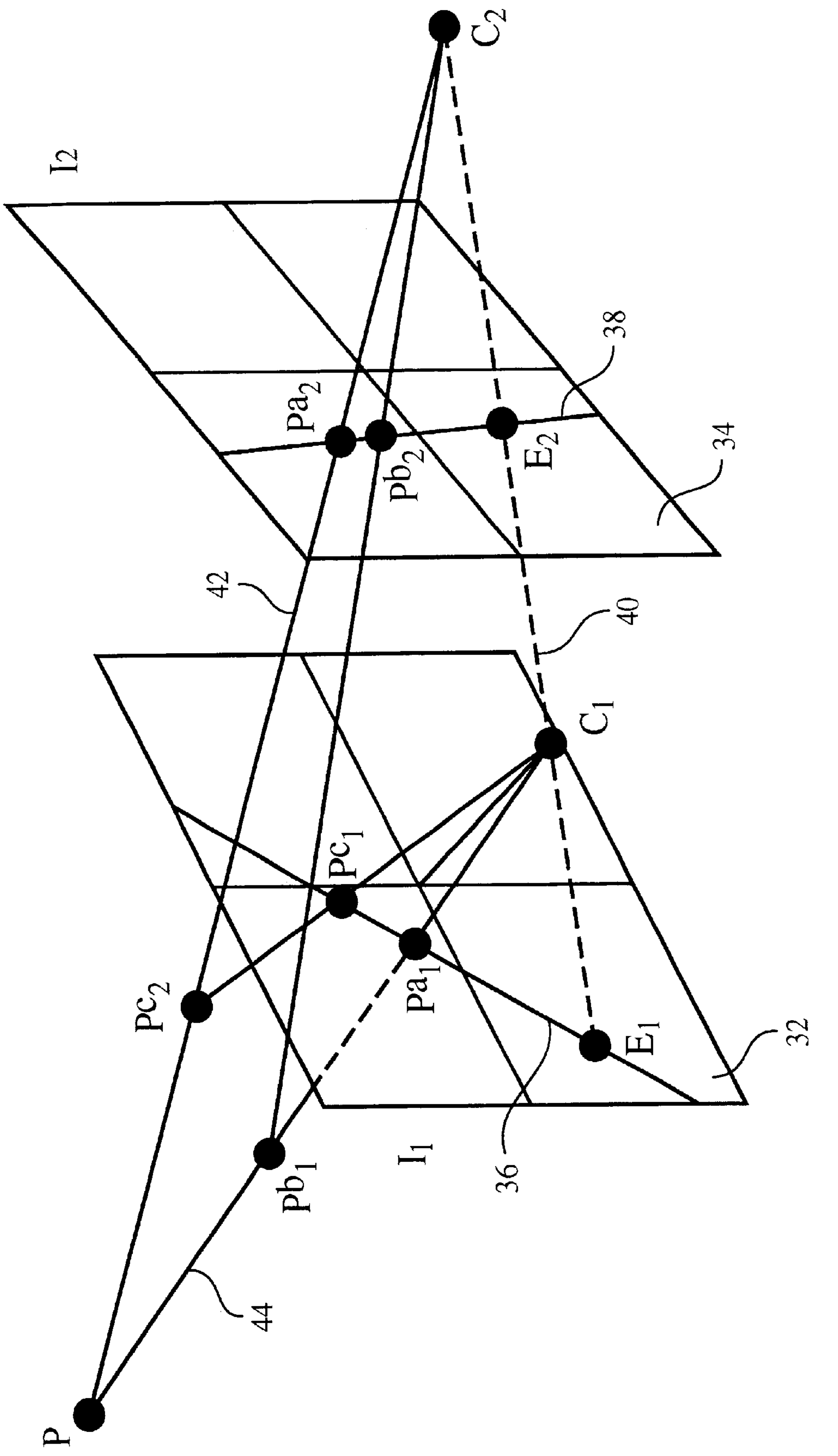
FIG. 3 illustrates the epipolar geometry.

Referring now to FIG. 3, a first view image $I_1$ is acquired from a first camera position $C_1$ and a second view image $I_2$ is acquired from a second camera position $C_2$. A line 40 ($\overline{C_1C_2}$) connecting the two different camera positions $C_1$ and $C_2$ for the two images is closely related to the epipolar geometry. Each image $I_1$, $I_2$ has a respective epipole $E_1$, $E_2$ defined by the intersection of line 40 ($\overline{C_1C_2}$) with the respective image planes 32, 34. A viewer observing a smooth transition between images $I_1$ and $I_2$ would be moving from $C_1$ to $C_2$ along the line 40 ($\overline{C_1C_2}$)

Locating the epipoles on the two vista images is therefore equivalent to aligning the two images along a common camera axis. After alignment, the respective epipole of each image will be in the center of the image. Finding the viewing angles ($\Theta_s$, $\Phi_s$) and ($\Theta_d$, $\Phi_d$) for each image (see FIGS. 1A and 1B) which transform the respective epipole to the image center, are the major tasks associated with view alignment.

The process of finding the epipoles is closely related to a fundamental matrix F which transforms the image points between two view images. For example, as seen in FIG. 3, a point $P^a_1$ on image $I_1$ is the projection of the points P and $P^b_1$ viewed along the line 44 ($\overline{pC_1}$) connecting the camera position $C_1$ with P and $P^b_1$. The points P and $P^b_1$ which appear as a single projected point $P^a_1$ on image $I_1$ appear on the other image $I_2$ as point $P^a_2$ (corresponding to point P) and to point $P^b_2$ (corresponding to point $P^b_1$). The line 38 connecting the points $P^a_2$ and $P^b_2$ on image $I_2$ is the epipolar line 38 of points $P^b_1$ and P which are projected as a single point $P^a_1$ on image $I_1$, and goes through the epipolar point $E_2$ on image $I_2$. In other words, the epipolar line 38 is the projection of all points located on the line 44 ($\overline{pC_1}$) onto the image plane 34 of $I_2$.

Conversely, different points P and $P^c_2$ projecting to the same point $P^a_2$ in image plane 34 of image $I_2$ are projected onto image points $P^a_1$ and $P^c_1$, respectively, on image $I_1$. The line 36 connecting the points $P^a_1$ and $P^c_1$ on image $I_1$ is the epipolar line 36 of points $P^c_2$ and P which are projected as a single point $P^a_2$ onto image $I_2$, and goes through the epipolar point $E_1$ on image $I_1$. In other words, the epipolar line 36 is the projection of all points located on the line 42 ($\overline{pC_2}$) onto the image plane 32 of $I_1$.

The fundamental matrix F (not shown) performs the transformation between the image points in images $I_1$ and $I_2$ just described. The transformation $F \bullet P_1$ relates points $P_1$ located on the epipolar line 36 on image plane 32 to points $P_2$ located on image plane 34 while the transformation $F^T \bullet P_2$ relates points $P_2$ located on the epipolar line 38 on image plane 34 to points $P_1$ located on image plane 32. $F^T$ is the transposed fundamental matrix F. As can be visualized from FIG. 3, all epipolar lines of an image intersect at the epipole.

The fundamental matrix F can be estimated by first selecting a number of matching point pairs on the two images (only $P_1$ and $P_2$ are shown), and then minimizing the quantity E defined as:

$$E = \sum_{i=1}^{N} (d^2(p_{i,2}, Fp_{i,1}) + d^2(p_{i,1}, F^T p_{i,2})), \qquad \text{Eq. (1)}$$

where $p_{i,1}$ and $p_{i,2}$ are the coordinates of the $i^{th}$ matched point on images $I_1$ and $I_2$, respectively. $d(p_{i,2}, Fp_{i,1})$ and $d(p_{i,1}, F^Tp_{i,2})$) is the distance from a specified point, e.g. $p_{i,2}$, to the corresponding epipolar line $Fp_{i,1}$. Matching point pairs on the two images are best matched manually, since source and destination images are often difficult to register due to object occlusion. However, point pairs can also be matched automatically if a suitable image registration method is available.

View images have perspective distortions, making aligning of view images difficult even with sophisticated morphing techniques. Vista images can be aligned more easily. The epipolar lines of vista images, however, are typically not straight due to the reprojection onto a cylinder, making the mathematical operations required to determine the epipoles rather complex. Vista images are therefore most advantageously first transformed into view images, as discussed below.

Figure 4:
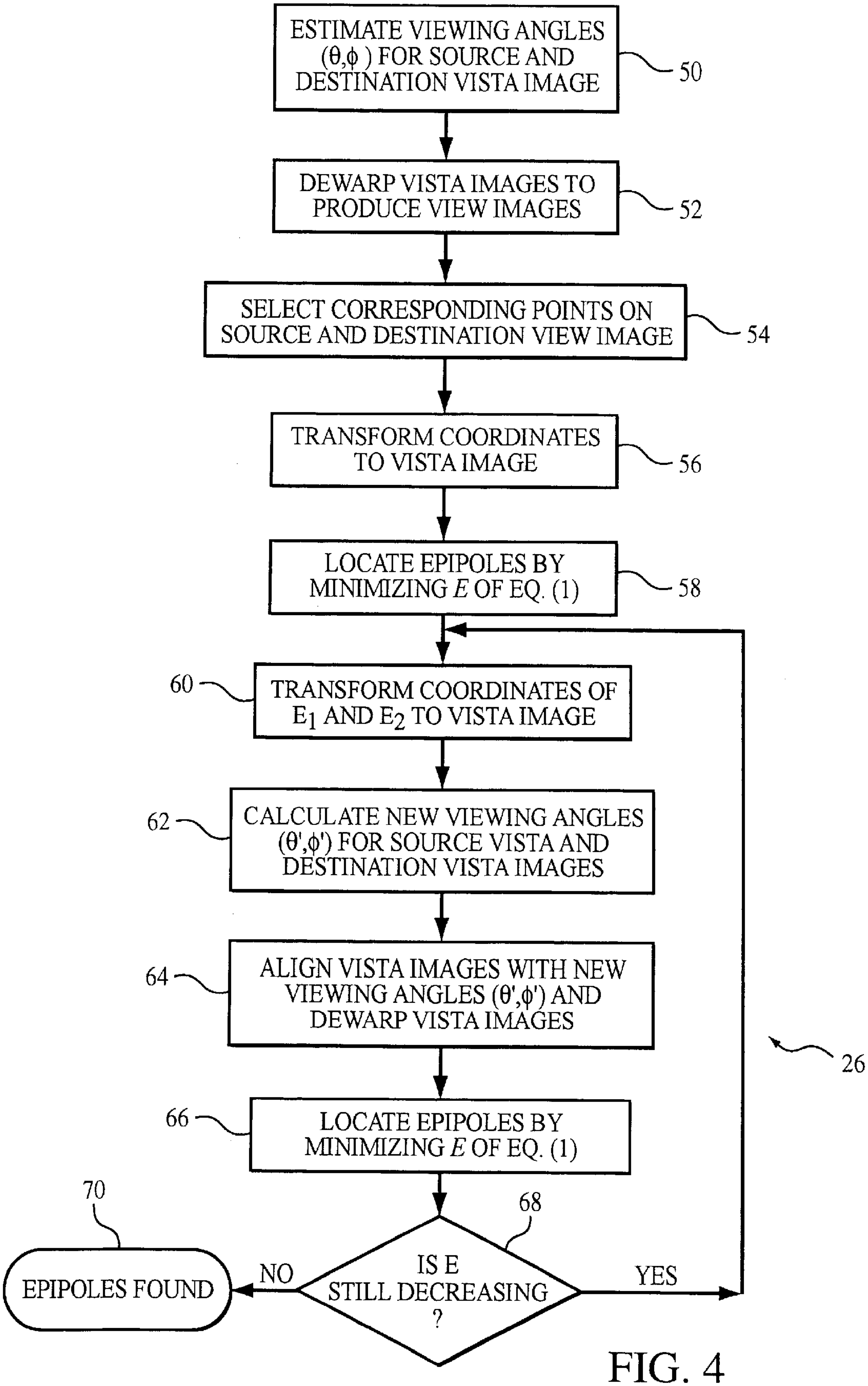
FIG. 4 is a flow diagram for finding the epipoles.
Figure 5:
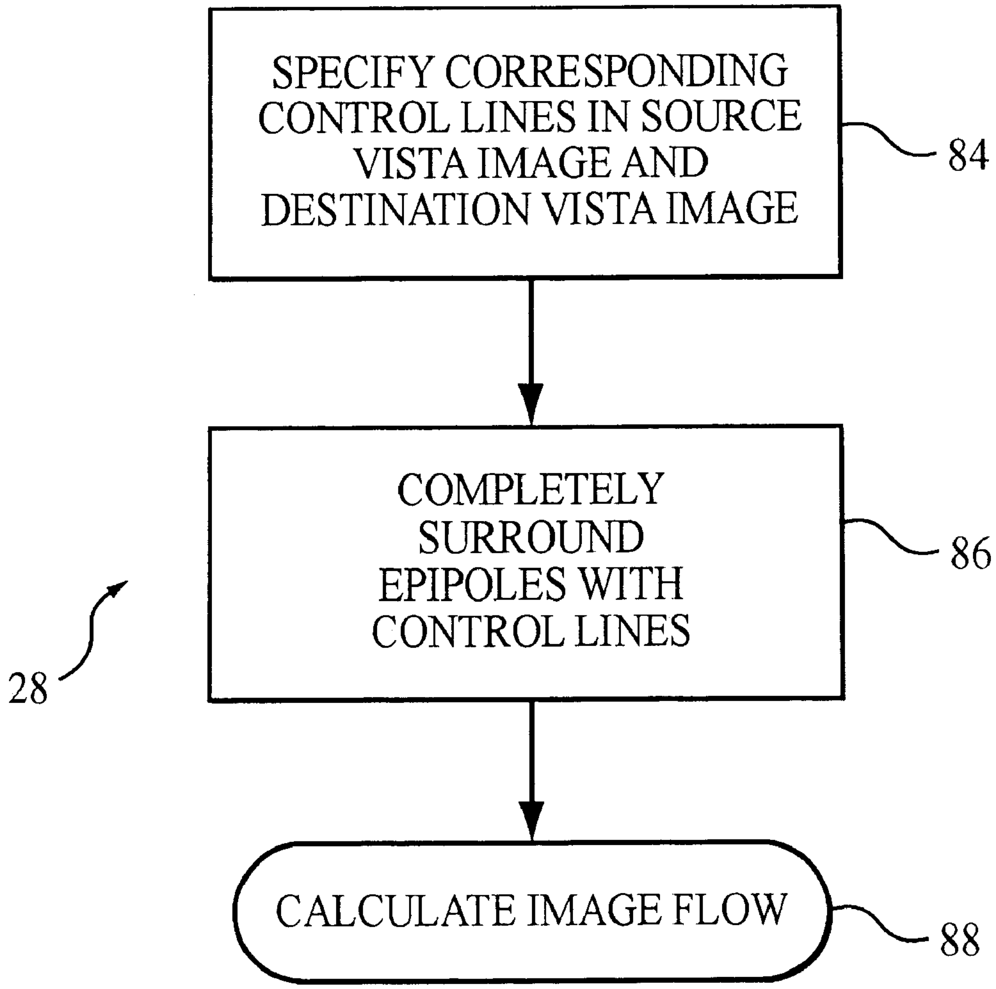
FIGS. 5 to 7 illustrate control lines.

FIG. 4 is a flow diagram of the view alignment process 26 for aligning a source vista image and a destination vista image by epipolar analysis. The user estimates (50) likely view angles ($\Theta_s$, $\Phi_s$) for the source vista image and ($\Theta_d$, $\Phi_d$) for the destination vista image. Since the vista images are projected on a cylindrical surface, they are first "dewarped" (52) to produce view images using equations (A1) and (A2) above. A certain number of corresponding points $p_{i,1}$ and $p_{i,2}$ are selected (54) on the source view image and destination view image, as described above. The coordinates of the corresponding points $p_{i,1}$ and $p_{i,2}$ on the view images are transformed (56) back to the vista image coordinates.

The quantity E of Eq. (1) is minimized (58) with the estimated view angles ($\Theta_s$, $\Phi_s$) and ($\Theta_d$, $\Phi_d$) to locate the epipoles $E_1$ and $E_2$ on the view images. The coordinates of $E_1$ and $E_2$ from are transformed back from the view image back to the vista image (60). If $E_1$ and $E_2$ are not estimated properly, which would be the case if E is a minimum, then new viewing angles ($\Theta'_s$, $\Phi'_s$) are calculated for the source vista image and ($\Theta'_d$, $\Phi'_d$) for the destination vista image based on the position of $E_1$ and $E_2$ on the vista images (62). Step 64 then aligns the vista images with the new viewing angles ($\Theta'_s$, $\Phi'_s$) and ($\Theta'_s$, $\Phi'_d$) and dewarps the vista images using the new viewing angles, creating new view images. Step 66 then repetitively locates new epipoles $E_1$ and $E_2$ on the new view images by minimizing E. Step 68 checks if the new viewing angles ($\Theta'_s$, $\Phi'_s$) and ($\Theta'_d$, $\Phi'_d$) produce a smaller E than the old viewing angles ($\Theta_s$, $\Phi_s$)) and ($\Theta_d$, $\Phi_d$). If E does not decrease further, then the correct epipoles $E_1$ and $E_2$ have been found 70 and the alignment process 26 terminates. Otherwise, the process loops back from step 68 to step 60 to determine new viewing angles ($\Theta''_s$, $\Phi''_s$) and ($\Theta''_d$, $\Phi''_d$).

The epipoles of the two final vista images are now located at the center of the images. The next step is to provide smooth transitions between the two vista images (morphing) using image flow analysis for determining the movement of each image pixel (step 28 of FIG. 2).

Referring now to FIGS. 5 through 8, the image flow (step 28 of FIG. 2) for each pixel is determined by densely matching the pixels between the source vista image and destination vista image. Each pixel of one image must have a corresponding pixel on the other image and vice versa, unless pixels are obscured by another object. A first step (84) requires specifying control lines 80, 82 on each image. Control lines are defined as lines that have unique and easily discernible characteristic features and can be, for example, roof lines, door frames, or any other suitable contiguous line or edge. Pixels located on a control line of one image have matching pixels located on the corresponding control line on the other image, unless the matching pixels are obscured by other objects. The image flow of pixels which are not located on the control lines, can then be inferred from the relationship between sets of corresponding control lines.

Figure 6A:
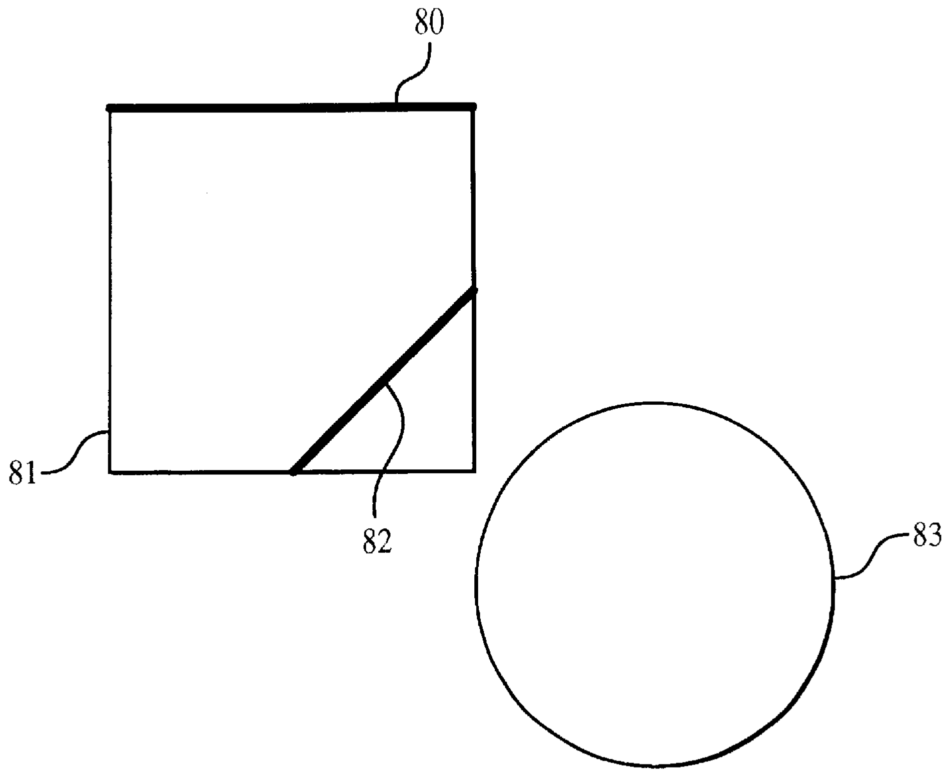
Figure 6B:
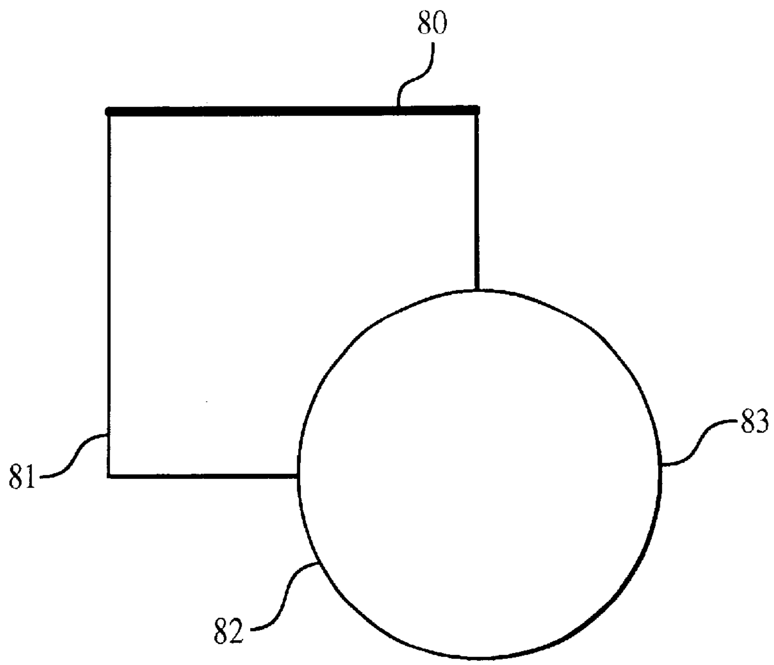

Two types of control lines are considered: "normal" control lines 80 and "hidden" control lines 82. The normal control lines 80 are lines that are visible on both images. Hidden control lines 82 are lines that are visible on one of the images, but are obscured by another object on the other image. The major purpose of a hidden line is to assist with the calculation of the image flow for the corresponding normal line on the other image. As seen in FIGS. 6A and 6B, an object 81 in a source image (FIG. 6A) has a normal control line 80 and a second control line 82. Another object 83 in the destination image (FIG. 6B) moves in front of object 81 and obscures a portion of object 81, including the second control line 82. Control line 82 is therefore a hidden control line. The epipoles are then completely surrounded by control lines (86), as indicated by the four control lines 100, 102, 104, 106 in FIG. 8. The image flow is then computed (88) based on these control lines.

Figure 7A:
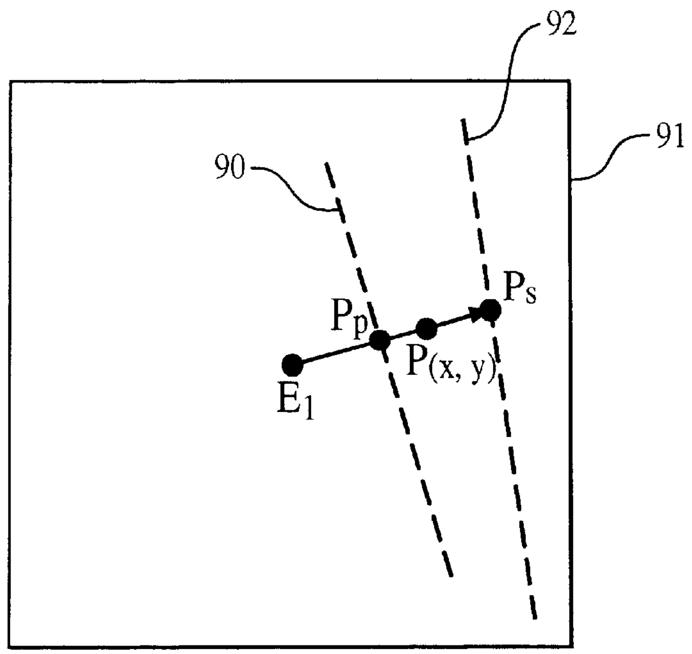
Figure 7B:
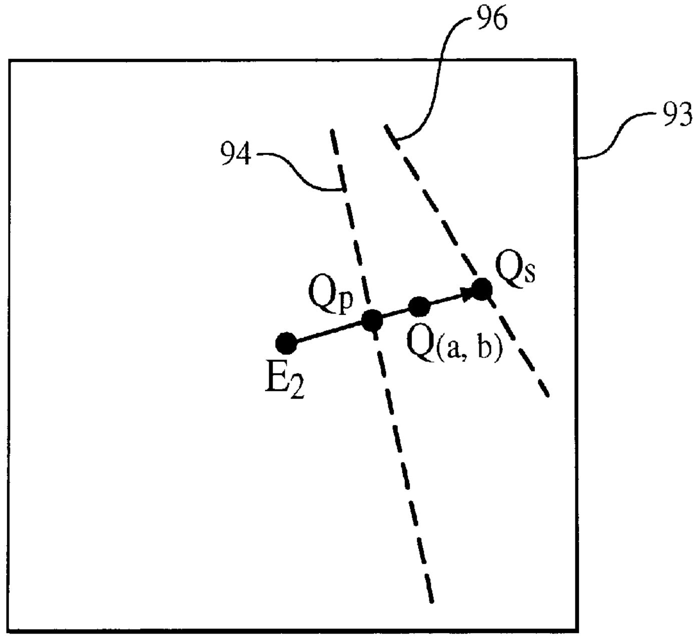

Referring now to FIGS. 7A and 7B, for computing the image flow, pairs of control lines 90 and 92 are selected on a source image 91. With each control line 90, 92, a respective control line 94, 96 is associated on the destination image 93. $E_1$ is the epipole of the source image 91 and $E_2$ is the epipole of the destination image 93. A pixel P with coordinates (x,y) is located between control lines 90 and 92 on the source image 91. The pixel Q with coordinates (a,b) corresponding to pixel P is located between control lines 94 and 96 on the destination image. The image flow of pixel P is then determined with the help of the control lines.

In particular, a line $\overrightarrow{E_1p}$ connecting E1 and p intersects control line 90 at a point $P_p$ and control line 92 at a point $P_s$. If the control line 90 is the control line closest to the point P and also located between P and $E_1$, then control line 90 is called the "predecessor line" of P. Similarly, if the control line 92 is the control line closest to the point P and is not located between P and $E_1$, then control line 92 is called the "successor line" of P.

Assuming that all control lines are normal control lines, then point $Q_p$ (corresponding to point $P_p$) and point $Q_s$ (corresponding to point $P_s$) will be readily visible on the destination image 93. The coordinates of $Q_s$ and $Q_p$ can be found by a simple mathematical transformation. The coordinates (a,b) of point Q can then be determined by linear interpolation between points $Q_s$ and $Q_p$.

Two situations can occur where the transformation described above has to be modified: (1) no predecessor control line 90 is found for a pixel P, i.e. no control line is closer to $E_1$ than the pixel P itself; and (2) no successor control line 92 is found, i.e. no control line is located farther away from $E_1$ than the pixel p itself. If no predecessor control line 90 is found, then no pixels $P_p$ and $Q_p$ exist. The coordinate (a,b) of pixel Q is then calculated by using instead of control line 90 the coordinates of the epipole $E_1$. If no successor control line 92 is found, then no pixels $P_s$ and $Q_s$ exist. The coordinate (a,b) of pixel Q is then calculated as the ratio between the distance of point p from the epipole $E_1$ and the distance of $P_p$ from the epipole. Details of the computation are listed in the Appendix.

Figure 8:
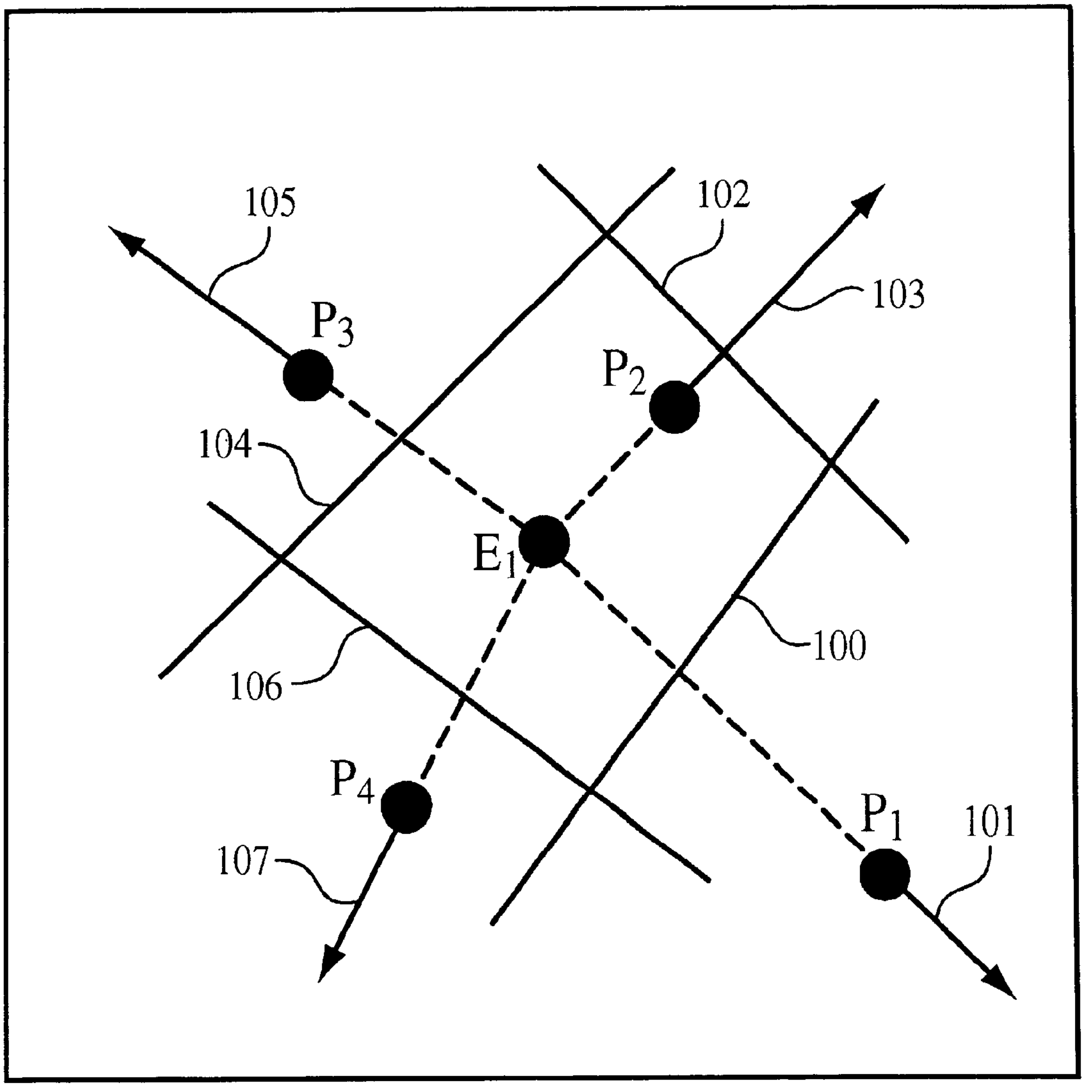
FIG. 8 is a flow diagram for computing the image flow.

As seen in FIG. 8, when the camera moves along line 40 of FIG. 3, each pixel $P_1$, $P_2$, $P_3$, $P_4$ on the source image moves radially outwardly from the epipole $E_1$, as indicated by the arrows 101, 103, 105, 107. The speed at which each pixel moves depends on the depth of that pixel, i.e. its distance from the viewer. The nearer the pixel is to the viewer, the faster the pixel moves. Accordingly, when the epipole $E_1$ is completely surrounded by control lines 100, 102, 104, 106, all pixels eventually have to cross one of the control lines. Pixels $P_1$, $P_3$, $P_4$ already crossed respective control lines 100, 104, 106, whereas pixel $P_2$ will cross control line 102 at a later time. This arrangement is referred to as "dense matching". This aspect is important for calculating the image flow. The designer can specify the control lines so that predecessor and/or successor control lines can always be found.

Once the control lines are established, the image flow, i.e. the intermediate coordinates for each pixel P(x,y) on the source image 91 and the corresponding pixel Q(a,b) on the destination image 93 can be calculated. To generate (N+1) frames, including the source image and the destination image, the image flow $v_x$ and $v_y$ in the x and y directions can be calculated by dividing the spacing between P and Q into N intervals of equal length:

$$v_x = \frac{a-x}{N} \text{ and } v_y = \frac{b-y}{N}.$$

As will be discussed below, pixels that are located between two control lines and move at significantly different speeds, have to be handled in a special manner. Such pixels will be referred to as "high-disparity pixels". The occurrence of high-disparity pixels implies that some scene objects represented by these pixels may be occluded or exposed, as the case may be, during vista transitions. The high-disparity pixels have to be processed specially. The following rule is used to label the high-disparity pixels. With $P_p$ and $P_s$ as illustrated in FIGS. 7A and 7B, a pixel P is referred to as high-disparity pixel the sum of the Euclidean distance $d(P,P_p)$ between the point P and $P_p$ and of the Euclidean distance $d(P,P_s)$ between the point P and $P_s$, respectively, is smaller than a predetermined constant T measured in units of pixels, e.g. 3 pixels. It should be noted that p can be a high-disparity pixel regardless of the speed at which the respective points $P_p$. $P_s$ move relative to P.

Figure 10:
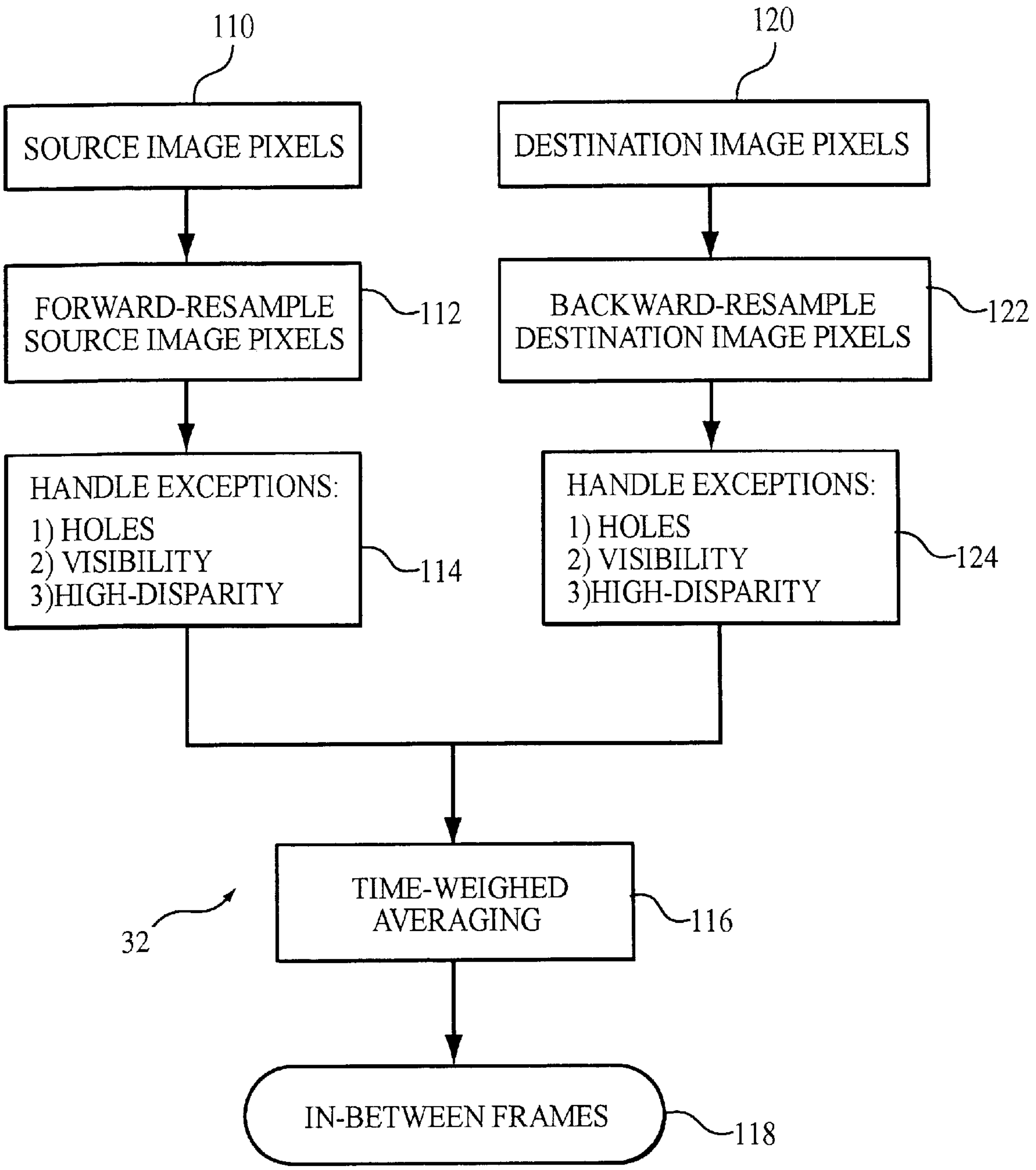
FIG. 10 is a flow diagram for creating in-between frames.

Once the image flow $v(v_x,v_y)$ is calculated for each pixel, the in-between frames are synthesized (step 32 of FIG. 2). Step 32 is shown in detail in FIG. 10. The source image pixels 110 are forward-resampled (112), whereas the pixels from the destination image 120 are backward-resampled (122). Exceptions, e.g. holes, pixel visibility and high-disparity pixels, which are discussed below, are handled in a special manner (steps 114 and 124). The in-between frames 118 are then computed (step 116) as a weighted average of the forward resampled and the backward resampled images.

We assume that N in-between frames 118 are required to provide a smooth transition between the source image 110 and the destination image 120. The following recursive equation holds:

$$p^{t+1}(i+v_x(i,j),\ j+v_y(i,j))=p^t(i,j), \qquad \text{Eq. (2)}$$

wherein $p^{t+1}$ (i,j) is the pixel value of the pixel $P^t$ (i,j) at the $i^{th}$ column and the $j^{th}$ row for the $t^{th}$ image frame obtained in forward resampling. $v_x$(i,j) and $v_y$(i,j) denote the horizontal and vertical image flow component, respectively. Similarly, for backward resampling:

$$p^{t-1}(i-v_x(i,j),\ j-v_y(i,j))=p^t(i,j), \qquad \text{Eq. (3)}$$

The following special situations have to be considered when the image pixels are resampled (steps 114 and 124, respectively): (1) Pixels in the resampled image do not have source pixels. This would cause "holes" in the resampled image. (2) High-disparity pixels indicating that some scene objects are to be exposed or occluded. The pixels to be exposed are invisible on the source images so that no visible pixel values are available on the source image to fill these pixels. (3) Pixels in the resampled image have more than one source pixel. This is referred to as "visibility" problem.

Figure 9B:
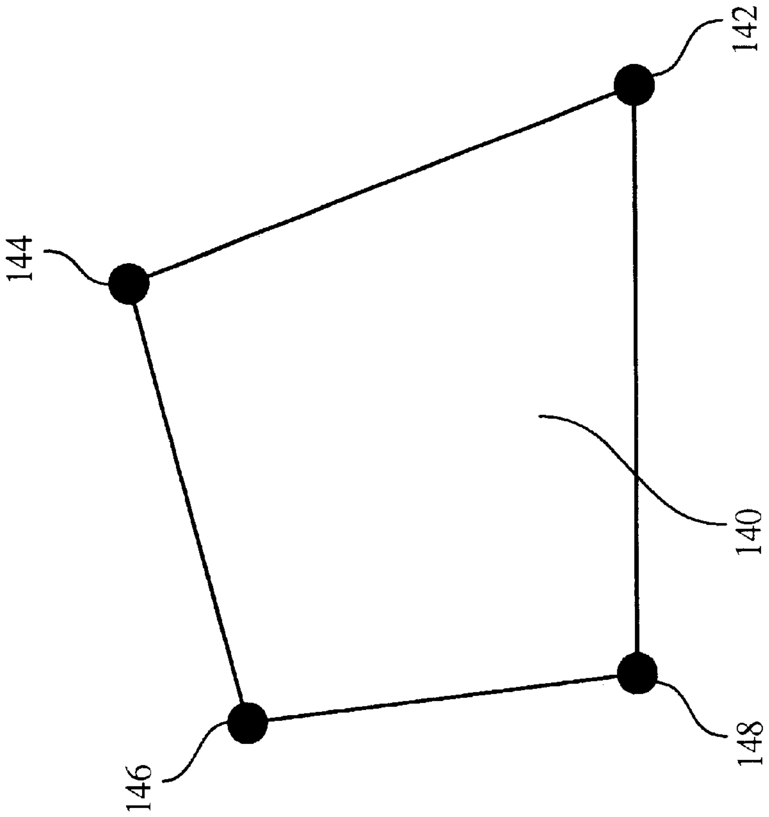
FIG. 9 illustrates handling of holes and visibility.
Figure 9A:
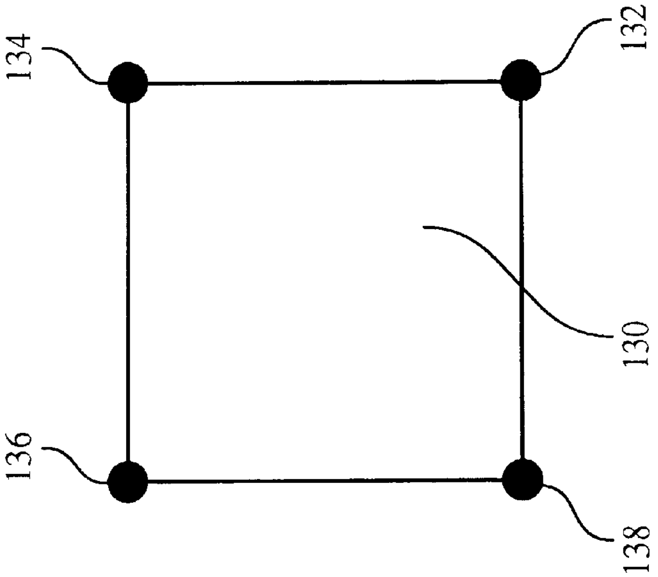

Referring now to FIGS. 9A and 9B, the "hole" problem in forward resampling (step 114, FIG. 10) is solved by the following grid-based filling method. FIG. 9A shows four neighboring pixels 132, 134, 136, 138 of the ttb frame of an image which are arranged on a 2×2 pixel grid and enclose a polygon 130. FIG. 9B shows the same four pixels at the $(t+1)^{th}$ frame of the image. The four pixels have now flowed into the corresponding four pixels 142, 144, 146, 148 which enclose a polygon 140. In the present example, polygon 140 has a larger area and contains more pixels than polygon 130. Therefore, additional pixels are required to fill polygon 140 and corresponding pixel values have to be assigned to those pixels. The present method assigns each of those pixels the value of pixel 138 and solves the hole problem satisfactorily.

Conversely, if one of the pixels 132, 134, 136, 138 is a high-disparity pixel, then the present method does not fill the polygon 140 and, instead, sets all pixel values inside the polygon to zero. Although this causes pixel holes in forward resampling, these holes will be filled when the forward resampled image is combined with the backward resampled image, to form the in-between frames, as discussed below. Pixels that are invisible on the source image, most likely become visible on the destination image.

The visibility problem is essentially the inverse of the hole problem. If more than one source pixel is propagated into the same final pixel, then the visible pixels have to be selected from these source pixels according to their depth values. The resampled image may become blurred if the final pixel value were simply computed as the weighted sum of the propagated pixel values. The visibility problem can be solved based on the epipolar and flow analysis described above, by taking into account the speed at which pixels move. A pixel which is closer to the epipole moves faster than a pixel that is farther away from the epipole. Using the same notation as before, in forward resampling N pixels $p_i$ with pixel values $p^t(x_i,y_i)$ ($1 \leq i \leq N$) propagate into the same pixel value $p^{t+1}(x,y)$ at the $(t+1)^{th}$ frame. The final value of $p^{t+1}(x,y)$ is taken as the pixel value $p^t(x_i,y_i)$ of the pixel $p_i$ that is closest to the epipole.

In backward resampling, the flow direction of the pixels is reversed from forward resampling. The final value of $p^{t+1}(x,y)$ is then taken as the pixel value $p^t(x_i,y_i)$ of the pixel $p_i$ that is farthest away from the epipole. The same method can also be used to solve the occlusion problem.

After forward resampling and backward resampling, each final in-between image frame is computed by a time-weighted summation of the two resampled images:

$$p^{t+1}(x,y)=\begin{cases}\left(\frac{N-t}{N}\right)p_f^t(x,y)+\frac{t}{N}p_b^t(x,y) & \text{if } p_f^t(x,t) \text{ is not a hole}\\ p_b^t(x,y) & \text{otherwise,}\end{cases}$$

wherein $p^t_f(x,y)$ and $p_b^t(x,y)$ denote a corresponding pair of pixels from forward resampling and backward resampling, respectively, and N is the desired number of in-between frames.

What is claimed:

1. Method for producing smooth transitions between a source vista and a destination vista, the source vista and the destination vista each comprising image pixels and an epipole, the method comprising:

locating the epipole on the source vista and the epipole on the destination vista by estimating a rotation and tilt between the source and destination vista;

aligning said source vista and said destination vista based on the located epipoles;

selecting at least one control line on the source vista and at least one control line on the destination vista corresponding to said at least one control line on the source vista; and calculating an image flow of image pixels between the source vista and the destination vista based on the control lines.

2. The method of claim 1, wherein said control lines on the source vista completely surround the epipole of the source vista.

3. The method of claim 1, further comprising:

generating in-between image frames between the source vista and the destination vista based on the image flow.

4. The method of claim 3, wherein generating the in-between frames comprises:

forward-resampling the image pixels from the source vista and backward-resampling the image pixels from the destination vista; and merging the forward-resampled and backward-resampled image pixels.

5. The method of claim 1, wherein locating the epipoles comprises:

selecting corresponding pairs of epipolar lines on the source vista and on the destination vista, and minimizing by an iterative process for a plurality of corresponding epipolar lines the sum of squared differences of a projected coordinate between an image pixel located on one vista and the image pixels located on the epipolar line of the other vista corresponding to said image pixel.

6. The method of claim 1, wherein locating the epipoles comprises:

reprojecting the source vista and the destination vista with the estimated rotation and tilt between the source vista and the destination vista to produce a respective source view image and a destination view image; and locating the epipoles on the source view image and the destination view image.

7. The method of claim 6, wherein locating the epipoles further comprises the steps of:

(a) iteratively computing distances between selected points located on one of the source view image and the destination view image and the corresponding epipolar lines located on the respective destination view image and source view image and squaring said distances and summing said squared distances until a minimum value is reached, said minimum value defining the location of the epipoles on the source view image and the destination view image, respectively; and (b) transforming the location of the epipoles on the source view image and the destination view image to corresponding locations on the source vista and destination vista;

(c) selecting new amounts of rotation and tilt based on the location of the epipoles on the source vista and destination vista and aligning the source vista and destination vista with the new amounts of rotation and tilt;

(d) reprojecting said source vista and destination vista to produce the respective source view image and a destination view image;

(e) repeating step (a) to compute a new minimum value and comparing said new minimum value with the previously determined minimum value; and (f) repeating steps (b) through (e) as long as said new minimum value is smaller than the previously determined minimum value.

8. The method of claim 4, wherein said merging comprises summing the forward-resampled and backward-resampled vistas as a weighted function of time.

9. The method of claim 4, wherein an image pixel on the forward-resampled vista that does not have a corresponding image pixel on the vista immediately preceding the forward-resampled vista, is assigned a special value.

10. The method of claim 9, wherein said special value is the value of the image pixel closest to said image pixel on the forward-resampled vista that has a corresponding image pixel on the vista immediately preceding the forward-resampled vista.

11. The method of claim 4, wherein said the image pixel value on the forward-resampled vista is zero if any image pixel adjacent to said image pixel on the vista immediately preceding the forward-resampled vista is a high-disparity pixel.

12. The method of claim 4, wherein an image pixel on the forward-resampled vista that has more than one corresponding image pixel on the vista immediately preceding the forward-resampled vista, is assigned the pixel value of the pixel that is closest to the epipole.

13. The method of claim 4, wherein an image pixel on the backward-resampled vista that has more than one corresponding image pixel on the vista immediately following the backward-resampled vista, is assigned the pixel value of the pixel that is farthest from the epipole.

14. A method for creating a sequence of moving images between panoramic vistas, comprising:

determining the alignment between the panoramic vistas from an epipole of each vista, determining an image flow between corresponding image features of the aligned panoramic vistas, forming at predetermined times and based on said image flow, intermediate forward resampled images of one of the vistas and corresponding backward resampled images of another one of the vistas, merging at each predetermined time the forward resampled image and the backward resampled image to form a sequence of in-between images.

* * * * *